Oct. 29, 1929.  L. D. SOUBIER  1,733,473

GLASS FORMING MACHINE

Filed Aug. 30, 1926   3 Sheets-Sheet 1

Oct. 29, 1929.   L. D. SOUBIER   1,733,473
GLASS FORMING MACHINE
Filed Aug. 30, 1926   3 Sheets-Sheet 2

Patented Oct. 29, 1929

1,733,473

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS-FORMING MACHINE

Application filed August 30, 1926. Serial No. 132,444.

My invention relates to improvements in glass forming machines, particularly the gravity fed or flow type adapted to form milk bottles and other ware.

It is customary in the formation of glassware upon flow type machines to invert the blank mold or the neck mold in transferring a parison to the finish mold for the final blow. Movement of the parison relatively to the mold carriage for any purpose whatever is objectionable, it having been found that where the parison or blank is held stationary relative to the mold carriage at all times, distorted neck portions and other faults which result solely from movement of the parison, are eliminated. It is obvious that because of the plastic condition of the parison, swinging of the blank about the horizontal axis of the neck or in fact any other movement of the blank will have a strong tendency to distort the blank as above indicated.

An object of the present invention is to eliminate the turn-over of the parisons and minimize the degree of movement to which the parison is subjected and thereby entirely eliminate or at least minimize in the formation of the ware, the defects ordinarily caused by changing the position of the blank. Elimination of the turn-over also permits compact arrangement of the molds so that the parison is exposed to the atmosphere for an unusually short period of time in its transfer from the blank mold to the finish mold, thereby maintaining the blank in proper condition for the final blow.

Referring to the accompanying drawings, a machine equipped with a continuously rotating mold carriage is shown associated with a feeder boot 200 having a submerged discharge outlet, from the walls of which charges of glass are periodically suspended and severed. The machine includes a set of circumferentially spaced units, each of which is equipped with a blank mold whose upper end is open and intended to periodically register with the discharge outlet of the feeder boot to receive charges of glass issued from said outlet. A neck mold reciprocable in a horizontal plane is intended to be shifted radially and brought into operative engagement with a blank mold, and after the neck end of the parison has been formed therein, return to its former position carrying the suspended parison. With completion of the return movement of the neck mold, the suspended parison is enclosed in a finish mold and blown to the form of the ware being produced. At a predetermined station, this finish mold opens, leaving the blown ware supported on a bottom plate of the usual or any preferred type which is then tilted to eject the blown ware from the machine.

In the machine construction, a base 20 is supported upon foundation blocks 21, the connection between these blocks and the base being in the form of threaded rods 22 which permit leveling of said base. A central stationary pillar 23 is set into the central portion 24 of the base 20 and supports a plurality of stationary cam tracks which cause periodic synchronized operation of mechanisms which will be described. The central portion 24 of the base 20 is formed with a vertical passageway 25 through which extends a stationary vacuum pipe 26. The lower end of this vacuum pipe 26 has a flange 27 providing rigid connection between said pipe and the base 20. The upper end of the vacuum pipe 26 extends above the stationary pillar 23 and rotatably supports a hollow head 28. A plurality of individual vacuum pipes 29 radiate from the head 28 and provide communication between the interior of said head and a number of circumferentially spaced vacuum chambers 30, the latter being mounted upon the upper section of a rotating mold carriage to be described. An air pressure pipe 35 extends through the vacuum pipe 26 and has communication with a chamber 36 in the upper portion of said head 28. This chamber 36 also communicates with a number of air pressure boxes or chambers 37 by way of a plurality of radiating pipes 38.

A set of vertically spaced stationary cams is mounted upon the stationary pillar 23. The lower cam 46 operates the finish molds. Intermediate cams 47 and 48 operate slides which move the neck molds radially and cause opening and closing of the neck molds. An upper stationary table 49 supports a series of circular cam tracks which control the periodic application of air and vacuum as will be hereinafter set forth.

A rotary mold carriage is mounted upon the base 20 and includes an annular bearing 40 supported from a flange 41, suitable antifriction bearings being interposed between said elements. A ring gear 42 is carried by the lower section 55 of the mold carriage and runs in mesh with a driving pinion 43, receiving power from any suitable source by way of meshing bevel gears 44 and a vertical shaft 45 which is fixed to said pinion 43 and journalled in bearings formed on the base 20.

Figure 1:
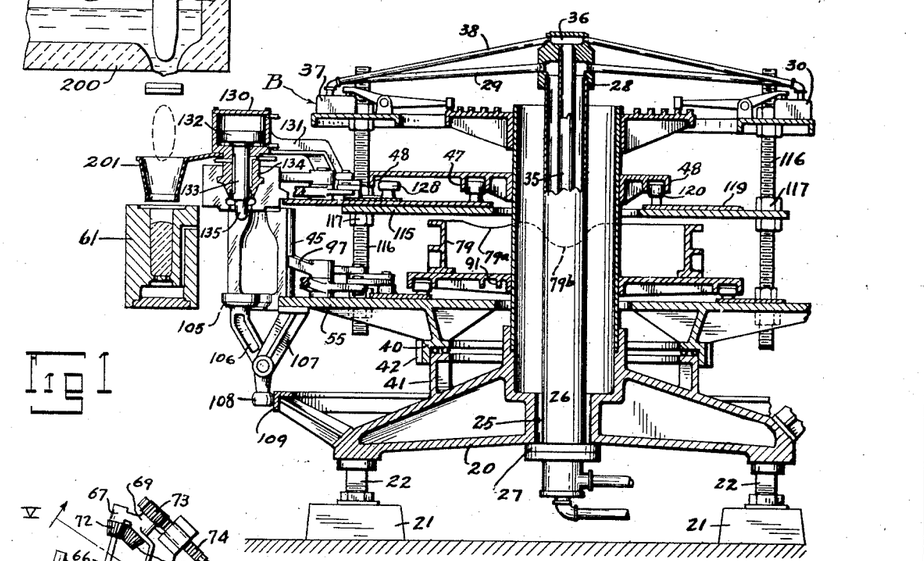
Fig. 1 is a sectional elevation taken substantially on the line I—I of Fig. 2, showing a forming machine constructed in accordance with my invention and associated with a gravity feeder.
Figures 4, 5:
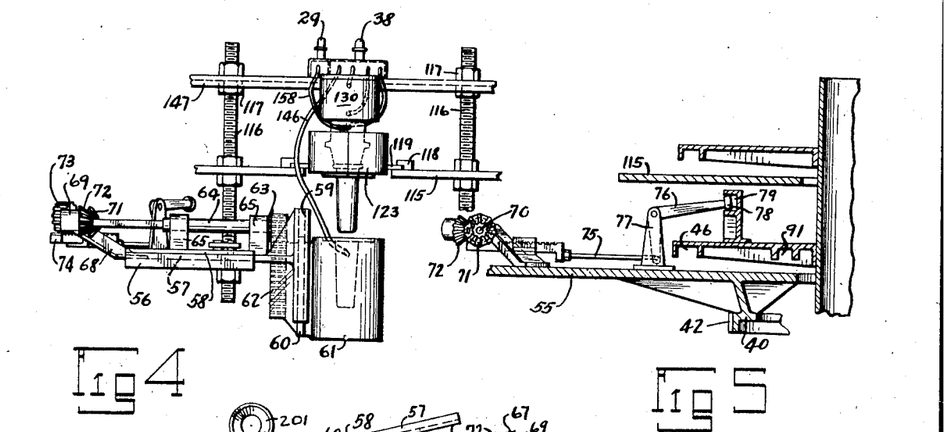
Fig. 4 is a fragmentary side elevation, showing a portion of one unit.
Fig. 5 is a sectional view taken substantially on the line V—V of Fig. 2.

The lower horizontal section 55 of the mold carriage is partially arranged in proximity to the lower side of the finish mold operating cam 46. A plurality of arms 56 radiate from this lower mold carriage section 55, each being provided upon its upper face with a pair of parallel transversely or tangentially extending guides 57 in which the opposite longitudinal edges of a blank mold carrying slide 58 are guided. One end of this slide 58 is formed with transversely spaced vertical guides 59 in which a slide 60 is arranged. This slide 60 rigidly carries a blank mold 61 and also mounts a vertical rack bar 62 meshing with a pinion 63 which is fixed to one end of a tubular shaft 64 journalled in bearings 65 mounted upon the slide 58 and movable transversely of the arm 56. A shaft 66, preferably of angular cross section, has one end telescoped within the tubular shaft 64, while its other end is journalled in a bearing 67 carried by a bracket 68. Each bracket 68 is fixed to a radiating arm 56 and carries a second bearing 69 in which a stub shaft 70 (Fig. 5) is journalled. One end of this shaft 70 carries a pinion 71 running in mesh with a gear 72 fixed to the aforementioned shaft 66. At the end of the stub shaft 70 opposite the pinion 71 is a gear 73 which is periodically rotated by a rack 74 fixed to the outer end of an operating rod 75. The inner end of this operating rod 75 is pivoted to one end of a bell crank lever 76 which in turn is pivoted to an upstanding bracket 77 and has its other end provided with a cam roll 78 running in a stationary cam trackway 79. As will be noted by reference to Figs. 1 and 5, this cam trackway 79 is fixed to the upper side of the finish mold operating cam 46, and is provided with circumferentially spaced depressions. One depression 79$^a$, with which the cam roll 78 first engages during operation of the machine, is relatively shallow and causes only a slight downward movement of the blank mold. The second depression 79$^b$, spaced from the first one, is of greater depth, allowing increased movement of the rack 74 and consequent lowering of the blank mold a sufficient distance below the neck mold 123 to permit lateral shifting of the blank mold clear of a parison, which, at this stage of operation, is suspended from the neck mold.

At a predetermined station, it is necessary to change the position of each blank mold 61 in order that a finish mold associated therewith may freely open, and to clear the path traveled by the ejected ware. Accordingly, a bell crank lever 85 is pivoted to a vertical stud 86 and has one end loosely connected to the slide 58 by a pin and slot connection. The other end of this lever 85 is pivoted to a control rod 87 whose inner end is connected to a slide 88, movable radially in a horizontal plane between spaced guides 89. A cam roll 90 is arranged at the inner end of the last named slide 88 and runs in a cam track 91 spaced inwardly from the finish mold cam track 46. Thus, it is seen that rocking of the bell crank lever 85 in one direction under influence of the cam mechanism will cause the desired change in the location of said blank mold 61.

Arranged between the radially extending arms 56 of the lower mold carriage section 55 are finish molds 95, each of which comprises complementary halves 96 having arms 97 pivoted to a stud 98 rising from the lower mold carriage section 55. The inner ends of the above mentioned arms 97 carry fingers 99 extending inwardly beyond the fulcrum point and having link connection to a slide 100 movable radially in a horizontal plane between guides 101 on the upper side of said mold carriage section 55. Each slide 100 is provided with a cam roll 102 which runs in a continuous finish mold cam track 46, heretofore referred to. It will be noted that this cam track 46 is provided with an offset portion 46$^a$ for holding the finish molds closed during the finish blow, which offset terminates substantially at the point at which the blank mold cam track begins. Obviously, this offset portion 46$^a$ in the finish mold cam track 46, may be of different lengths in accordance with the type of ware being produced. In this connection, it is to be noted that a longer finish blow is essential to the proper setting of the plastic material in the finish of relatively heavy ware, while a shorter blowing period is required in the proper setting of the finish of smaller articles.

Bottom plates 105 for the finish molds 95 are carried at the upper ends of arms 106 fulcrumed to depending brackets 107 fixed between the radial arms 56 to the lower section 55 of the mold carriage. A cam roll 108 is mounted upon the lower end of each arm 106 and rides upon a continuous cam track 109 spaced outwardly from and rigidly connected to the base 20 of the machine. This cam track 109 normally supports the finish mold bottom plate 105 in a position to be enclosed by the finish mold sections, but is provided with a raised portion 110 which, as will be noted by reference to Fig. 6, allows tilting of the plate carrying arm 106 at a given station at which the ware is ejected from the machine. This raised portion 110 is so located that it tilts the bottom plate just after the finish mold 96 has opened and the completely blown article is ready for ejection.

Figure 3:
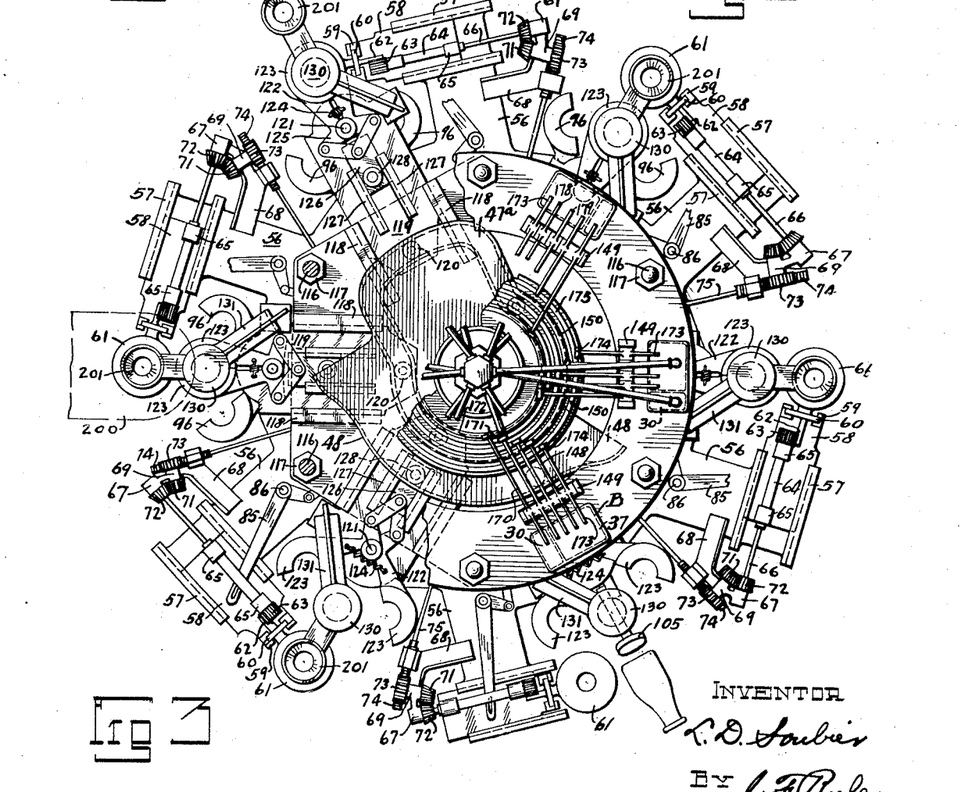
Fig. 3 is a plan view with parts broken away, exposing the intermediate mold carriage section, the neck mold, and the blow head.

Arranged above the lower section 55 of the mold carriage is a table or intermediate section 115. This table 115 and the lower mold carriage section 55 are held in fixed spaced relation by a plurality of connecting rods 116 equipped with locking or spacing nuts 117 whose function is obvious. This table 115 is provided with pairs of parallel spaced guides 118 on its upper face, each pair being located directly above a finish mold slide 100 and adapted to guide a horizontally arranged neck mold slide 119 radially of the mold carriage. The inner end of each neck mold slide 119 is equipped with a cam roll 120 which travels in the continuous cam track 47 heretofore described. This slide 119 is provided near its outer end with an upstanding stud 121 to which forwardly extending arms 122 of neck mold sections 123 are pivoted. These neck mold sections 123 are normally yieldably held in contact with each other by a coil spring 124 which interconnects the neck mold arms 122 at a point adjacent the stud 121. Rearwardly or inwardly of the fulcrum point, the arms 122 are formed with outwardly extending fingers 125 which have link connection with an auxiliary slide 126 arranged upon the upper side of the neck mold slide 119. As is noted in Figs. 3 and 6, this last named auxiliary slide 126 is movable radially between a pair of spaced guides 127 and is provided with a cam roll 128 which is periodically actuated by a neck mold cam track 48. This cam track 48 is so located that it actuates the auxiliary slide 126 at substantially the period at which the closed finish molds pass the offset portion 46$^a$ of the finish mold operating cam 46. While the neck mold sections 123 are normally closed, it is evident, particularly by reference to Fig. 3, that the offset portion 47$^a$ will cause an inward movement of the neck mold slide 119 at a period sufficiently in advance of arrival of the latter at one end of the neck mold cam 48, to assure a slight inward movement of the cam roll 128 and the auxiliary slide 126. Thus, it is seen that the neck mold cam 48 actuates the auxiliary slide and causes opening of the neck mold sections 123 simultaneously with opening of the finish mold sections, thereby completely freeing the blown article for ejection from the machine.

Blow heads 130 individual to each associated pair of blank and finish molds are each rigidly connected to each neck mold slide 119 by means of an arm 131. These blow head carrying arms 131 extend obliquely over the neck mold arms 122 from one longitudinal edge of the neck mold slide 119, thereby providing sufficient clearance between the several moving parts to preclude interference with their individual operations. Each blow head includes a piston 132 provided with a depending stem 133 extending through the sleeve 134 and formed with a core 135 at its lower end. This core 135 is intended to form the usual bubble or initial blow opening in a parison.

Since the several units of this machine are identical, the following description will be directed to a single unit.

According to the present invention, each blank mold 61 (Fig. 7) comprises a single block of suitable material having a mold cavity 140 formed centrally therein and communicating through apertures 141 in the bottom 142 with a chamber 143. The upper end of this cavity 140 is open to receive charges from a feeder boot or the like 200. This chamber 143 is closed at its lower end by a bottom plate 144 and is formed with an air conduit 145 opening through one side of the mold body 61. Each ware forming unit of the machine includes a blank mold constructed as just set forth.

A flexible air pipe 146 forms communication between the chamber 143 in the bottom of the blank mold 61 and an air pressure compartment 37 in a box "B" arranged upon the top section 147 of the mold carriage. This compartment 37 of the box may have communication with any suitable air pressure supply by way of pipes 38 and 35 as brought out heretofore. Periodic admission of air pressure into the chamber 143, and consequently into the lower end of the mold cavity 140, is effected by providing a valve (not shown) controlling movement of air to the flexible pipe 146. This valve is operated by a lever 148 fulcrumed to an upstanding bracket 149 on the top section 147 of the mold carriage, said lever having on its inner end a cam roll riding upon a continuous cam track 150.

As is customary, the depending sleeve 134 carried by each blow head is provided with opposed vacuum and air pressure ports 157 and 160, respectively, adjacent its upper end. The vacuum port 157 is connected to a pipe 158 and is intended for periodic registration with a longitudinal channel 159 in the stem 133. This channel 159 provides communication between the vacuum port and a groove 156 in the wall of the passageway through the sleeve 134, the lower end of said groove opening into a vacuum chamber 155 adjacent the neck mold cavity.

A channel 161 in the aforementioned wall provides periodic communication between a pipe 162 connected to the air pressure port 160, and said vacuum chamber 155, thereby providing for blowing of ware at predetermined intervals. It is noted that when the core 135 projects into the blank mold cavity, communication is provided between the vacuum pipe 158 and said chamber 155. Raising of the core and stem shuts off the vacuum and forms communication between the air pressure pipe and said chamber 155.

As is customary, the air motor 165 includes a cylinder having ports 166 at its upper and lower ends, which alternately admit air pressure to the cylinder for the purpose of raising and lowering a piston 132 which carries the aforementioned depending stem 133. Relative rotation of the stem 133 and the sleeve 134 and consequent dis-alignment of the slots or channels therein is prevented by fixing a guide rod 168 in the upper end of the air motor cylinder, said rod being of angular cross section and slidable in an axial opening of angular cross section in the piston and stem.

Simultaneously with application of air pressure through the pipe 146 to the lower end of a charge in the blank mold, a vacuum is created in the annular chamber 155 adjacent the neck mold cavity, thereby drawing a portion of the charge into the cavity to form the finish of the ware being produced. This vacuum is created by the opening of a valve (not shown) in the vacuum compartment 30 of the box "B" mounted upon the upper section of the mold carriage. Said valve is periodically actuated by a lever 170 fulcrumed to the aforementioned upstanding bracket 149 and carrying at one end a cam roll 171 which rides upon a continuous cam track 172. The air pressure pipe 162 communicating with the upper end of the longitudinal channel 161 and intended to blow the parison to its final form, communicates with one of the radial air pressure pipes 38 by way of one of the aforementioned boxes "B". A valve (not shown) is arranged to cut off the air supply to the pipe 162 and is periodically actuated by a lever 173 also fulcrumed to the bracket 149 and carries a cam roll 174 which rides upon the face of the outer cam track 175. Air pressure is periodically applied to the cylinder of the air motor through the ports 166 from one of the radial air supply pipes 38 by way of valves (not shown) in one of said boxes "B". Inner and outer continuous cam tracks 176 and 177, periodically actuate levers 178 and 179 thereby alternately operating the valves (not shown) and admitting air pressure to the motor as required at different stages of operation.

The operation of the machine may be stated as follows:

The machine is so set that at the discharge outlet of the feeder boot 200 a funnel guide 201 carried by the blow head and one of the blank molds 61, register with each other at the time a suspended charge of glass is severed, thereby assuring delivery of such charge into the blank mold.

Figure 2:
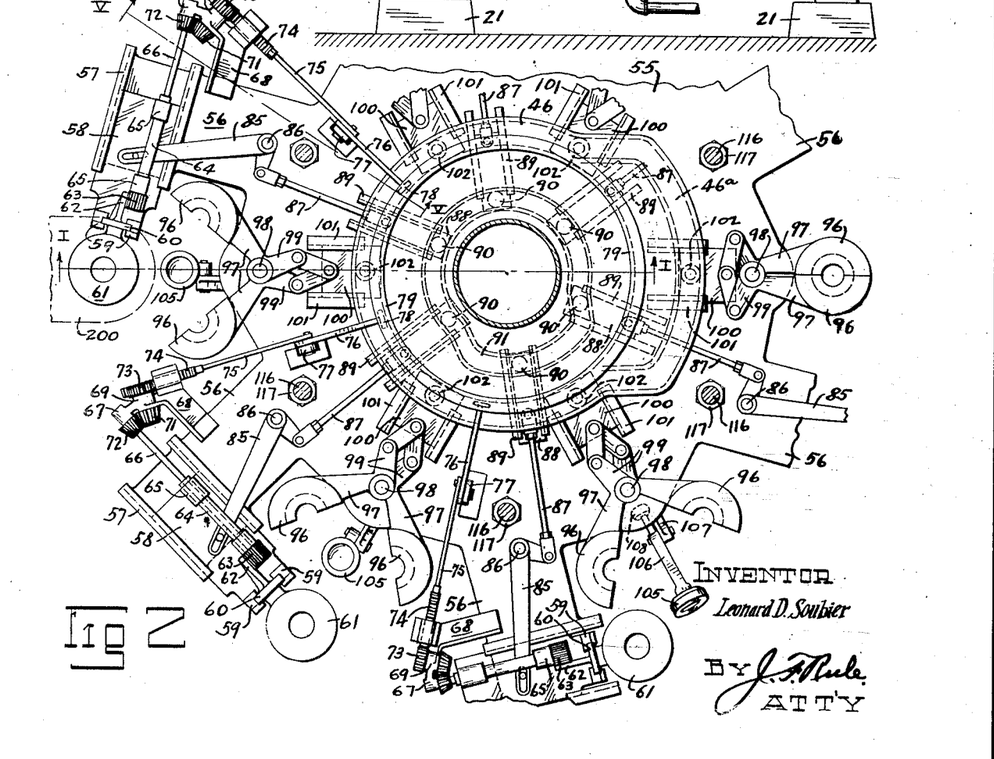
Fig. 2 is a horizontal sectional elevation showing the lower mold carriage section and mechanism supported thereon.
Figures 6, 7, 8, 9, 10, 11, 12, 13:
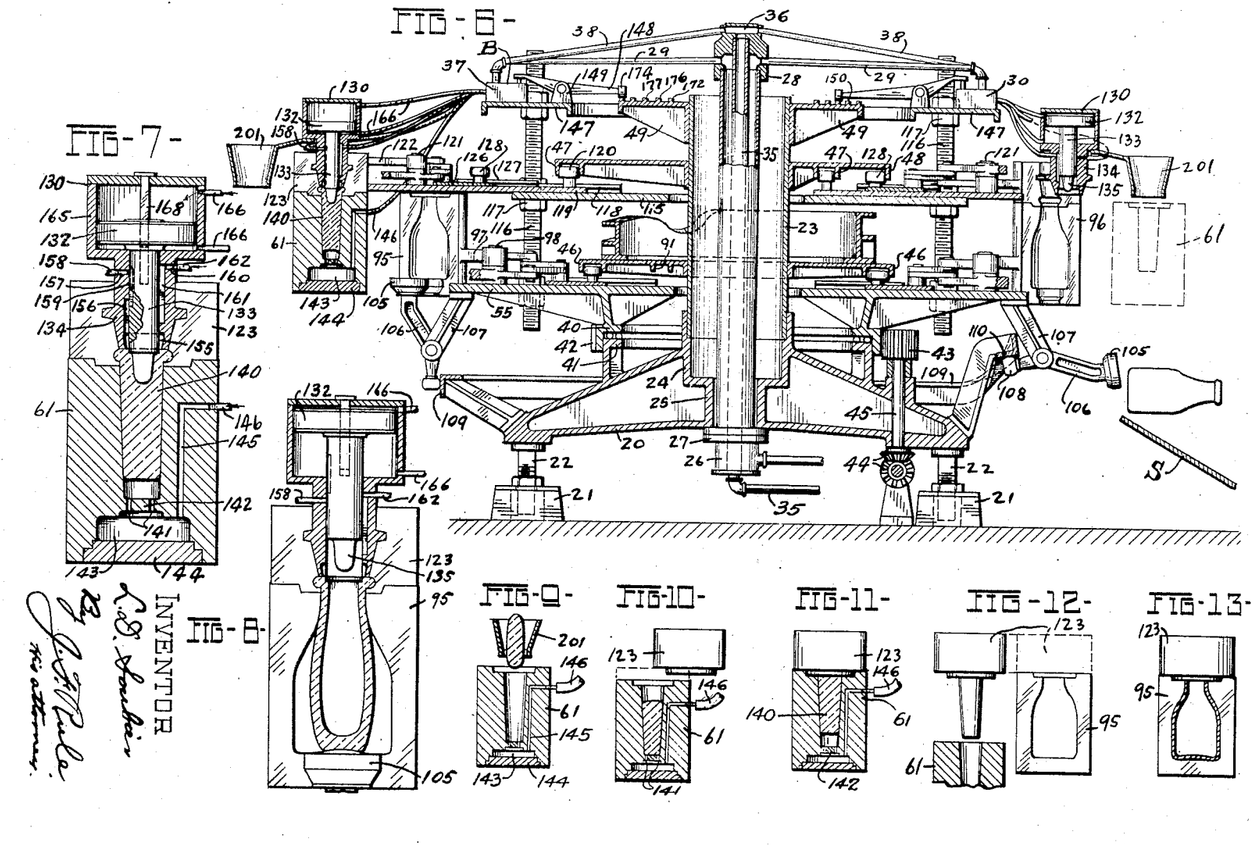
Fig. 6 is a vertical sectional elevation showing at the left, the molds in parison forming relation, and at the right, the ware being ejected from the machine.
Fig. 7 is a detail section partly in elevation, showing the neck and blank molds and blow head in parison forming relation.
Fig. 8 is a view similar to Fig. 7, but shows the finish mold substituted for the blank mold.
Fig. 9 shows the blank mold and its funnel guide in their initial positions.
Fig. 10 shows the blank mold lowered to permit movement of the neck mold to a position over said blank mold.
Fig. 11 shows the blank and neck molds in register.
Fig. 12 is a detail showing the blank mold lowered away from the formed parison suspended from the neck mold, and the finish mold about to enclose the parison.
Fig. 13 is a detail showing the article blown to final form in the finish mold.

Continuous clockwise movement of the mold carriage, moves the cam roll 78 to the depressed portion 79$^a$ of the blank mold cam track 79 (see Figs. 1 and 5), thereby causing a slight rocking of the bell crank lever 76. This bell crank lever movement shifts a rack bar 74 inwardly, causing partial rotation of the gears 71, 72 and the shaft 64. As will be noted in Fig. 4, the pinion 63 on one end of the shaft 64 will be rotated in a direction to cause lowering of the blank mold 61 to a plane slightly below the neck mold 123 as indicated by full lines in Fig. 10. At this stage, rotation of the mold carriage has brought the cam roll 120 of the neck mold slide 119 to an offset portion 47$^a$ of the neck mold cam track 47, (see Fig. 3) which causes a neck mold slide 119 to move radially outward and brings the neck mold 123 into register with the blank mold 61. The depression 79$^a$ in the blank mold operating cam 79 and the last named offset portion 47$^a$ are so relatively positioned that immediately upon completion of outward movement on the part of the neck mold 123, the cam roll 79 returns to its normal position, causing a return of the blank mold 61 to its former upper position at which it operatively engages the neck mold 123 as shown in Figs. 6 and 7. This relation of the two molds is maintained while air pressure is applied through the lower end of the blank mold cavity and a vacuum created in the annular chamber 155 adjacent the neck mold cavity. The period of application of vacuum and air pressure to the charge is of sufficient duration to compact the molten glass in the upper end of the blank mold cavity and force portions into the cavity in the neck mold, thereby forming the finish of the article being produced. The cam roll 78 of the blank mold operating mechanism is then lowered a considerable degree under influence of a relatively deep depression 79$^b$ (Fig. 1), spaced circumferentially from the shallow depression 79$^a$ in the cam track 79, thereby rocking the lever 76 and consequently rotating the shaft 64 and causing a lowering of the blank mold 61 to a point below the lower end of a parison which is now suspended from the neck mold 123 (see Fig. 4). The cam roll 120 on the neck mold slide 119 follows the neck mold cam track 47 and moves the slide, together with the neck mold 123 and the parison now suspended from the latter, inwardly to a position at which said parison may be enclosed in a finish mold. At this point, the cam roll 102 on the finish mold cam track 100 (see Fig. 2), enters the offset portion 46$^a$ of the finish mold cam track 46 causing an outward movement of the slide 100 and closing of the finish mold sections around the suspended blank. Immediately upon completion of the finish mold closing operation, air under pressure is admitted through the port 160 into the depending sleeve 134 of the blow head. The piston 132 and the stem 133 carried thereby having been moved upwardly, the air under pressure enters the initial blow opening in the parison by way of the aforementioned longitudinal channel 161 formed in the wall of the passageway through said sleeve 134 and blows the ware to its final form. The length of the offset portion 46$^a$ of the finish mold cam 46 determines the length of the final blowing period which varies with the type of ware being produced. Just prior to arrival at the station at which the blown article is to be ejected from the machine, the cam roll 102 carried by the finish mold slide 100, moves inwardly to its normal position and separates the finish mold halves as shown in Figs. 2 and 6. Just in advance of opening of each finish mold, the adjacent blank mold slide 58 moves tangentially of the machine under influence of the bell crank lever 85 which is rocked by the cam track 91 and cam 90, thereby shifting the blank mold 61 out of the path of travel followed by the ware as it is ejected from the machine. The neck mold halves which have been inter-engaged up to this point by means of a coil spring 124, are now separated due to engagement between the cam roll 128 and a cam track 48 (see Fig. 3). Simultaneously with opening of the neck and finish molds 123 and 95 respectively, and shifting of the blank mold 61 from the path of travel of ware being ejected, the cam roll 108 on the bottom plate carrying arm 106 reaches the raised portion 110 of the cam track 109 (see Fig. 6). Thus, it is seen that the bottom plate will be tilted and discharge the ware from the machine onto a slide "S" which may direct the ware to a conveyor or other mechanism (not shown).

Manifestly, certain changes may be resorted to within the spirit and scope of the appended claims.

What I claim is:

1. A glassware forming apparatus comprising a neck mold, a blank mold, a finish mold normally in substantially the same horizontal plane as the blank mold, means to reciprocate the neck mold in a horizontal plane to alternately position the latter in register with and above the blank and finish molds, means to shift the blank mold laterally away from the path of movement of the neck mold, and a single glass blowing device moving with the neck mold to alternately co-operate with said blank and finish mold.

2. Glass forming apparatus comprising a continuously rotating mold carriage, a radially reciprocable neck mold on said carriage, blank and finish molds adapted for alternate engagement with the lower side of said neck mold at opposite ends of its path of travel, and a single device to form a parison in the blank mold and blow the parison to final shape in said finish mold by applying air pressure internally of the molds.

3. Glass forming apparatus comprising a continuously rotating mold carriage, a radially reciprocable neck mold on said carriage, a blow head movable with said neck mold, blank and finish molds adapted for alternate engagement with the lower side of said neck mold, automatic means opening the finish mold at a given station, and means to shift the blank mold laterally away from the path of travel of the neck mold at intervals.

4. Glass forming apparatus comprising a continuously rotating mold carriage, a radially reciprocable neck mold on said carriage, a blow head movable with said neck mold, a blank mold, a finish mold spaced inwardly from the blank mold, and automatic means causing alternate operative engagement of the blank and finish molds with the neck mold.

5. Glass forming apparatus comprising a continuously rotating mold carriage, a radially reciprocable neck mold on said carriage, a blow head movable with said neck mold, a blank mold, a finish mold spaced inwardly from the blank mold, and cam mechanism causing alternate operative engagement of the blank and finish molds with the neck mold.

6. Glass forming apparatus comprising in combination a rotary blank mold carriage, a blank mold having an open upper charge receiving end, a neck mold movable in a horizontal plane into register with said upper ends, means for lowering the blank mold away from the neck mold, a finish mold spaced inwardly from the blank mold and automatically movable into operative engagement with the lower end of the neck mold in timed relation with the blank mold movement, and a single device for forming a parison in the blank mold and blowing the parison to final form in the finish mold by applying air pressure internally of the molds.

7. Glass forming apparatus comprising in combination, a rotary mold carriage, a vertically movable blank mold thereon having an open upper charge receiving end, a horizontally reciprocable neck mold, a finish mold spaced horizontally inward from the blank mold, means causing operative engagement of the blank and finish molds with the neck mold at opposite ends of the path of movement of the latter, and pneumatic means movable with the neck mold for forming a blank in said blank mold and expanding the blank in the finish mold.

8. Glass forming apparatus comprising in combination, a rotary mold carriage, a horizontally reciprocable neck mold mounted for radial movement thereon, blank and finish molds arranged at opposite ends of the radial path of movement of said neck mold, automatic means alternately moving the blank and finish molds into operative engagement with the neck mold, and a single device for forming a blank in said blank mold and expanding the blank in the finish mold.

9. Glass forming apparatus comprising, in combination, a continuously rotating mold carriage, a neck mold mounted upon and reciprocable radially of said mold carriage, a blank mold arranged at the outer end of the path of movement of said neck mold, a finish mold at the inner end of said path of movement, means for alternately operatively engaging the blank and finish molds with the neck mold, automatic means periodically effecting tangential movement of the blank mold relative to the mold carriage, and pneumatic means coacting with said molds to form ware.

10. Glass forming apparatus comprising, in combination, a continuously rotating mold carriage, a neck mold and blow head mounted for unitary radial movement upon the carriage, a blank mold arranged at the outer end of the path of movement of the neck mold and blow head, a partible finish mold at the other end of said path, and means periodically moving the blank mold out of the path of travel of ware ejected from the finish mold.

11. Glass forming apparatus comprising, in combination, a continuously rotating mold carriage, a neck mold and blow head mounted for unitary radial movement upon the carriage, a blank mold arranged at the outer end of the path of movement of the neck mold and blow head, a partible finish mold at the other end of said path, means for periodically moving the blank mold out of the path of travel of ware ejected from the finish mold, said last named means comprising a horizontally movable slide fixed to said blank mold, and cam and lever mechanism periodically moving said slide.

12. Glass forming apparatus comprising, in combination, a continuously rotating mold carriage, a neck mold and blow head mounted for unitary radial movement upon the carriage, a blank mold arranged at the outer end of the path of movement of the neck mold and blow head, a partible finish mold at the other end of said path, means for periodically moving the blank mold out of the path of travel of ware ejected from the finish mold, said last named means comprising a horizontally movable slide fixed to said blank mold, cam and lever mechanism periodically moving said slide, and means permitting periodic vertical adjustment of said blank mold on the slide.

13. Glass forming apparatus comprising, in combination, a continuously rotating mold carriage, a neck mold mounted for radial movement upon said carriage, a blow head, a blank mold, a partible finish mold, means for raising and lowering the blank mold into and out of engagement with the neck mold, means to move the blank mold laterally from the path of travel of the neck mold, and means for operatively engaging the finish mold with the neck mold in timed relation with movement of the blank mold.

14. Glass forming apparatus comprising, in combination, a continuously rotating mold carriage, a neck mold mounted for radial movement upon said carriage, a blank mold, a partible finish mold, means for raising and lowering the blank mold into and out of engagement with the neck mold, means for operatively engaging the finish mold with the neck mold in timed relation with movement of the blank mold, means for shifting the blank mold laterally from below the path of the neck mold movement in timed relation with operation of the finish mold, and pneumatic means for forming a parison in the blank mold and blowing the ware to its final form in the finish mold.

15. Glass forming apparatus comprising, in combination, a continuously rotating mold carriage, a neck mold mounted for radial movement upon said carriage, a blank mold, a partible finish mold, means for raising and lowering the blank mold into and out of engagement with the neck mold, means for operatively engaging the finish mold with the neck mold in timed relation with movement of the blank mold, means for shifting the blank mold laterally from below the path of the neck mold in timed relation with actuation of the finish mold, and pneumatic means for forming a parison in the blank mold and blowing the parison to final form in the finish mold, said pneumatic means including a blow head associated and movable with the neck mold radially of the mold carriage.

16. Glass forming apparatus comprising, in combination, a continuously rotating mold carriage, circumferentially spaced arms extending radially from said carriage, a neck mold movable radially of the carriage intermediate said arms, a blank mold normally positioned at the outer end of the path of travel of the neck mold, a slide connection between said blank mold and one of the aforementioned arms, means periodically moving the slide and blank mold transversely with respect to said arm, additional means for raising and lowering the blank mold into and out of engagement with the neck mold, a partible finish mold arranged inwardly from the blank mold, means effecting operative engagement between the finish mold and neck mold in timed relation with movement of the blank mold, and pneumatic blowing means associated with said molds.

17. Glass forming apparatus comprising, in combination, a continuously rotating mold carriage, circumferentially spaced arms extending radially from said carriage, a neck mold movable radially of the carriage intermediate said arms, a blank mold normally positioned at the outer end of the path of travel of the neck mold, a slide connection between said blank mold and one of the aforementioned arms, means periodically moving the slide and blank mold transversely with respect to said arm, additional means for raising and lowering the blank mold into and out of engagement with the neck mold, a partible finish mold arranged inwardly from the blank mold, means effecting operative engagement between the finish mold and neck mold in timed relation with movement of the blank mold, and pneumatic ware blowing means associated with said molds, said pneumatic means including a blow head movable with the neck mold radially of the mold carriage.

18. Glass forming apparatus including a neck mold reciprocable in a horizontal plane along a definite path, a blow head movable with said neck mold to form a blank and then expand the blank, a blank mold and finish mold at opposite ends of the path of movement of said neck mold, means for lowering the blank mold in advance of arrival of the neck mold at the outer end of its path and then raising said blank mold into cooperative relation to the neck mold to allow formation of a parison, means for lowering the blank mold to a point below the formed parison permitting movement of the latter and the neck mold to the finish mold, and means periodically opening and closing the finish mold in timed relation with the blank and neck mold movement.

19. Glass forming apparatus including a neck mold reciprocable in a horizontal plane along a definite path, a blow head movable with said neck mold, blank molds and finish molds at opposite ends of the path of movement of said neck mold, means for lowering and raising the blank mold in advance of arrival of the neck mold at its outer limit to allow formation of a parison, means for lowering the blank mold to a point below the formed parison permitting movement of the latter and the neck mold to the finish mold, means automatically closing and opening the finish mold, and means for shifting the blank mold laterally from below the path travelled by the neck mold in timed relation with operation of the finish mold.

20. The combination of a continuously rotating mold carriage, circumferentially spaced arms extending in a horizontal plane radially from said carriage, a slide reciprocable transversely of each arm, a blank mold slidable vertically on one end of said slide, automatic means periodically raising and lowering the mold relatively to the slide, a finish mold, a neck mold reciprocable in a horizontal plane for alternate operative engagement with the blank and finish molds, a blow head associated with the neck mold, and cam and lever mechanism periodically moving the slide and blank mold transversely of said arm in timed relation with movement of the neck and finish molds.

21. In a glass forming machine, the combination of a mold carriage, means to rotate it, a blank mold thereon, a finish mold thereon between the blank mold and the axis of the carriage, means to transfer a blank of glass from the blank mold to the finish mold, means for discharging an article from the finish mold, and means for moving the blank mold laterally of the carriage radius out of the path of discharge of said article.

22. In a machine for forming glass articles, the combination of a mold carriage rotatable about a vertical axis, a circle of blank molds thereon, a circle of finish molds thereon at substantially the same elevation and spaced inwardly from the blank molds, a circle of neck molds above the blank and finish molds, said molds arranged in groups each comprising a blank mold, a finish mold and a neck mold, means to move a neck mold into register with the blank mold of its group, means to form a parison in the registered neck and blank mold, means to cause a relative vertical movement of the neck mold and blank mold while the parison is supported in the neck mold to clear the parison of the blank mold, means to then shift the neck mold with the parison radially inward into register with the finish mold, means to close the finish mold around the parison, and means to blow the parison in the finish mold comprising a blow head arranged over and movable with the neck mold.

23. In a machine for forming glass articles, the combination of a mold carriage rotatable about a vertical axis, a circle of blank molds thereon, a circle of finish molds thereon at substantially the same elevation, a circle of neck molds above the blank and finish molds, said molds arranged in groups each comprising a blank mold, a finish mold and a neck mold, means to move a neck mold into register with the blank mold of its group, means to form a parison in the registered neck and blank mold, means to shift the neck mold with the blank supported thereby into register with the finish mold for transferring the blank to the finish mold, means to blow the blank in the finish mold, means for opening the finish mold, a mold bottom for the finish mold, means for causing said bottom to tilt outwardly to discharge the finished article, and means for shifting the blank mold laterally out of the path of movement of the finished article in advance of said discharge.

24. A glassware forming machine comprising a body mold having an open upper charge receiving end, a neck mold, means to deliver a mold charge to the body mold, means to then move the neck mold to a position above and in register with the body mold to close the upper end of the latter, and means to move a mold charge upwardly in the body mold to fill the neck mold and completely form a blank.

25. In a glassware forming machine, the combination of a body mold, a neck mold, means to deliver a charge of molten glass to the body mold, means to then move the neck mold into co-operative relation to the body mold, and means to create a differential pressure at opposite sides of said mold charge to move the latter lengthwise in the body mold and fill the neck mold.

Signed at Toledo, in the county of Lucas and State of Ohio, this 26th day of August, 1926.

LEONARD D. SOUBIER.